C. E. & W. H. KRUEGER.
COMBINATION GAGE AND BEVEL SQUARE.
APPLICATION FILED JULY 6, 1908.
924,675.
Patented June 15, 1909.
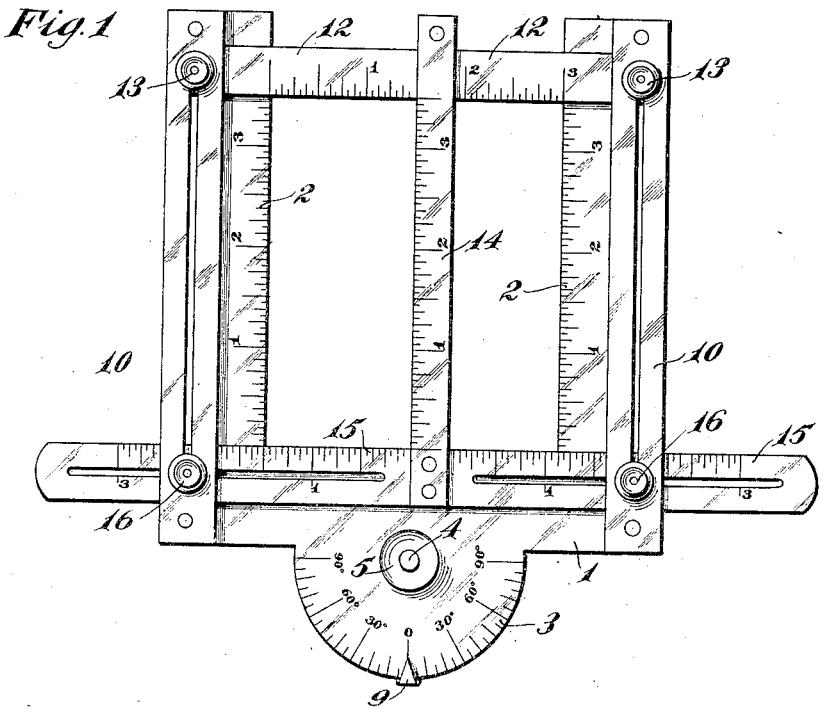
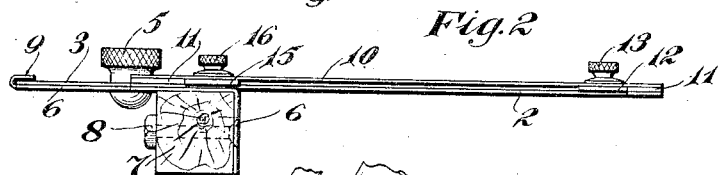
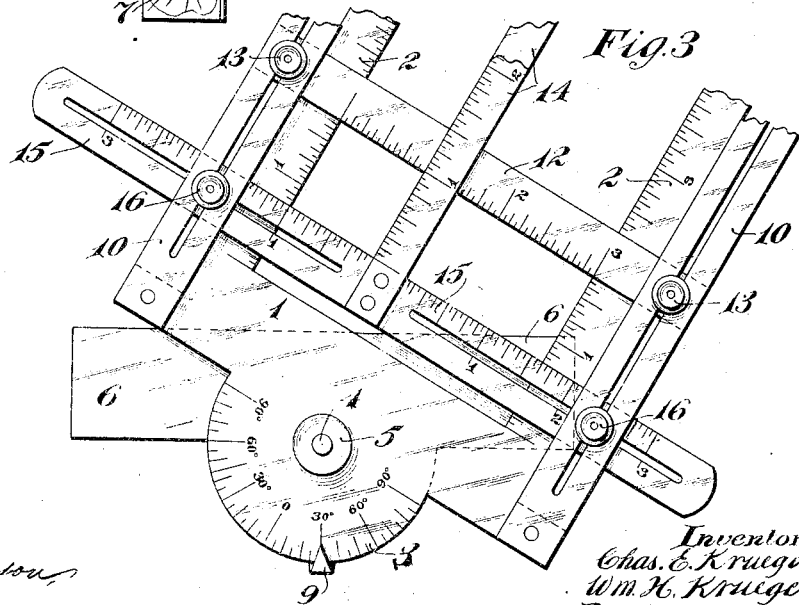
Witnesses:
L. L. Simpson
W. H. Souba
Inventors:
Chas. E. Krueger
Wm. H. Krueger
By their Attorneys
Williamson Muchard

UNITED STATES PATENT OFFICE.

CHARLES E. KRUEGER AND WILLIAM H. KRUEGER, OF MINNEAPOLIS, MINNESOTA.

COMBINATION GAGE AND BEVEL-SQUARE.

No. 924,675.     Specification of Letters Patent.     Patented June 15, 1909.

Application filed July 6, 1908. Serial No. 441,991.

*To all whom it may concern:*

Be it known that we, CHARLES E. KRUEGER and WILLIAM H. KRUEGER, citizens of the United States, residing at Minneapolis, in the county of Hennepin and State of Minnesota, have invented certain new and useful Improvements in Combination Gages and Bevel-Squares; and we do hereby declare the following to be a full, clear, and exact description of the invention, such as will enable others skilled in the art to which it appertains to make and use the same.

Our invention has for its object to provide an improved tool in the nature of a combination gage and bevel square, and to this end it consists of the novel devices and combinations of devices hereinafter described and defined in the claims.

In the accompanying drawings which illustrate the invention, like characters indicate like parts throughout the several views.

Referring to the drawings, Figure 1 is a plan view of the improved device. Fig. 2 is a side elevation of the same; and Fig. 3 is a view corresponding to Fig. 1, but with some parts broken away and with the parts shown in different adjustment than that illustrated in Fig. 1.

A bifurcated gage plate 1 having parallel graduated arms or side portions 2 is provided with an intermediately located graduated segment 3. Said gage plate 1, at the axis of its segment 3, is pivotally connected, by a screw 4 having a knurled nut 5, to an underlying segmental flange of an angular plate 6, to the depending flange of which a head block 7 is shown as secured by means of a nutted bolt 8. The angular bracket 6 is provided with a pointer 9 which is bent upward and over the graduated segment 3 and coöperates with the latter to indicate in degrees the angular position of the gage plate in respect to the head block 7. Longitudinally grooved guide bars 10 overlie the graduated sides of the gage plate 1 and are rigidly secured thereto at their ends by rivets or bolts, but are spaced slightly apart by thin spacing blocks 11. Extending transversely of the graduated arms 2 of the gage plate 1 is a graduated scale or bar 12, the ends of which are arranged to slide between the graduated arms 2 and the overlying slotted guide bars 10, and are adjustably connected to the said guide bars by clamping screws and nuts 13, which screws work in the slots of the said bars.

In connection with the device described, there is provided a sort of a T-square, both the blade 14 and head portion 15 of which are graduated. The head portion 15 of this T-square is long and its ends work between the graduated arms 2 and the slotted guide bars 10 and clamping screws and nuts 16, which nuts work through the transversely intersecting slots of said bars 10 and head 15, serve to secure the said T-square in any desired adjustment. The blade 14 of this T-square is made up of a pair of thin metal strips 12 slightly spaced apart so that they embrace the scale bar 12.

The gage plate 1, with the parts carried thereby, is adapted to be turned into any angular position in respect to the head block 7, so that the device may then be used as a bevel square or for various other purposes requiring work to be laid out at an angle. Both the T-square 14—15 and the scale bar 12 may be set in various adjustments on the gage plate, as is made evident by comparing Figs. 1 and 3. The said parts may be set for marking an angular hole of any dimensions, within certain limits of course, and the tool may be set for locating the said hole at any desired angle in respect to the same straight edge or surface.

The device will be found very convenient for marking out lock seats in doors, for marking out mortise and miter joints and various notches and seats for various purposes. It is also capable of being used as a marking compass or caliper in measuring thickness of bodies.

What we claim is:

1. In a tool of the kind described, the combination with a gage plate having laterally spaced graduated arms, of a scale extending transversely of and adjustably secured in respect to the graduated arms of said gage plate, and a graduated T-square adjustably secured in respect to the arms of said gage plate and to said scale, substantially as described.

2. In a tool of the kind described, the combination with a gage plate having laterally spaced graduated arms and slotted guide bars secured to but spaced apart from the arms thereof, of a scale having its ends interposed between said graduated arms and slotted guide bars and adjustably secured to the latter by clamping screws and nuts, and a graduated T-square having a slotted head arranged to work between the arms of said gage plate and said slotted guide bars and adjustably secured to the latter by clamping screws and nuts working in the slots of said guide bars and head, said T-square having a blade made up of laterally spaced members between which the said scale is passed.

3. In a tool of the kind described, the combination with a head block, of a gage plate pivotally connected thereto and provided with laterally spaced parallel arms, a scale bar adjustably secured at its ends in respect to the arms of said gage plate, and a T-square adjustably secured in respect to the arms of said gage plate with its blade overlapping said scale bar.

4. The combination with a head block, of a gage plate intermediately pivoted to said head block and provided with a graduated segment and with laterally spaced graduated arms, said head block having a pointer coöperating with said segment, a scale bar adjustably secured at its ends in respect to the graduated arms of said gage plate, and a graduated T-square connected to the graduated sides of said gage plate with freedom for transverse and longitudinal adjustments, and the blade of which T-square overlaps said graduated scale, substantially as described.

In testimony whereof we affix our signatures in presence of two witnesses.

CHARLES E KRUEGER
WILLIAM H. KRUEGER

Witnesses:
MALIE HOEL,
F. D. MERCHANT.